Figure 1:
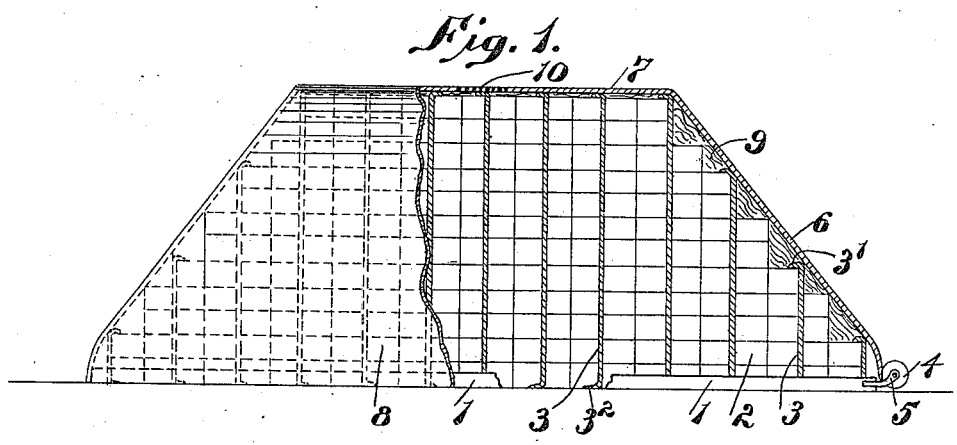

E. M. BOYNTON.
MEANS FOR PROTECTING AND PRESERVING ICE.
APPLICATION FILED MAY 12, 1905.

964,143.

Patented July 12, 1910.

3 SHEETS—SHEET 1.

E. M. BOYNTON.
MEANS FOR PROTECTING AND PRESERVING ICE.
APPLICATION FILED MAY 12, 1905.

964,143.

Patented July 12, 1910.
3 SHEETS—SHEET 2.

E. M. BOYNTON.
MEANS FOR PROTECTING AND PRESERVING ICE.
APPLICATION FILED MAY 12, 1905.
964,143.
Patented July 12, 1910.
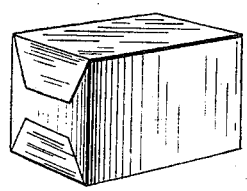
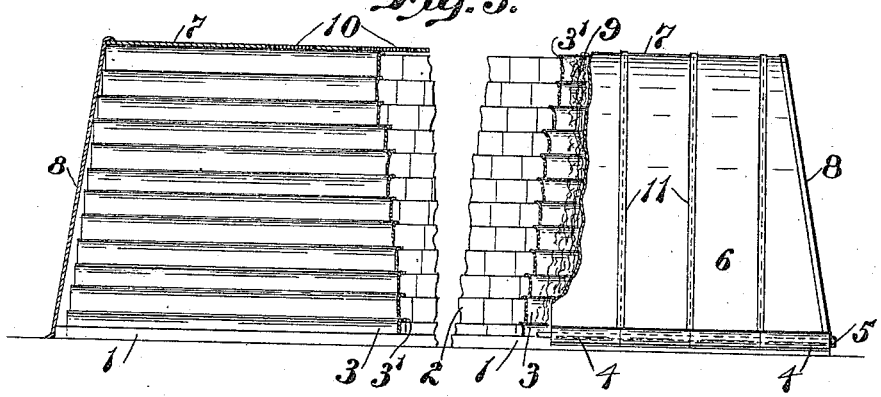

UNITED STATES PATENT OFFICE.

EBEN MOODY BOYNTON, OF WEST NEWBURY, MASSACHUSETTS.

MEANS FOR PROTECTING AND PRESERVING ICE.

964,143. Specification of Letters Patent. Patented July 12, 1910.

Application filed May 12, 1905. Serial No. 260,108.

*To all whom it may concern:*

Be it known that I, EBEN MOODY BOYNTON, of West Newbury, in the county of Essex and State of Massachusetts, have invented certain new and useful Improvements in Means for Protecting and Preserving Ice, of which the following, taken in connection with the accompanying drawings, is a specification.

The object of this invention is to protect more perfectly and economically ice from atmospheric destruction and change of temperature, and to cheapen and simplify the means for its preservation.

It has hitherto been the custom to preserve ice by stacking it in a large mass in ice-houses, with crevices from the top to the bottom of the mass and covering the same with straw or other dunnage. These ice-houses have hitherto been costly permanent structures of wood, brick or stone, and provided with an interior casing formed with double walls of wood backed with saw dust to prevent penetration of the atmosphere and the melting of the ice. The ice-houses have thus represented a large outlay of capital, and have thus increased the ultimate cost of ice to the consumer. For example, I estimate that a building constructed in the ordinary manner for the preservation of ice, at first cost, is at an average of $1.00 per ton of ice. The subsequent annual loss by depreciation, interest and insurance, I estimate is at the rate of 20c. per ton or substantially double the cost of harvesting the ice. Not only has the ordinary method of preserving ice been costly, but at the same time there is always a risk of the entire structure being consumed by fire from spontaneous combustion due to the presence of the masses of inflammable material employed for dunnage, and on this account the cost of insurance on such structures is much greater (usually tenfold) than that for ordinary farm buildings.

In accordance with my invention, I propose to preserve the ice by arranging the blocks thereof in a stack or pile and the outer covering the same with a casing of flexible material, the strips of which may be sealed together to completely exclude air and moisture, and thus protect the ice against atmospheric and thermal changes, so that I am enabled to reduce the loss, due to meltage and deterioration, and provide a temporary structure with a small outlay of capital.

Preferably the material, which I employ, comprises one or more layers of wool-felt, or other fabric, impregnated with a suitable water-proof material such as a composition or compound of asphaltum, sulfur, and mineral oil or petroleum residuum. Preferably I utilize at least two layers of fabric with an intermediate layer of foraminous material such as fiber of great strength, or wire netting, thus producing a sheet which is substantially air-proof, water-proof and slow burning, by which the ice may be protected from the atmosphere and from changes in thermal or atmospheric conditions.

In the utilization of my invention, the ice may be cut in blocks in any well known manner, which blocks are ordinarily 10 inches to 16 inches in thickness, and about 15 inches in width by 30 inches in length. They may be removed from the water after due separation and conveyed to the stack where they are placed in piles or vertical layers with cavities between them. After the ice stack of considerable height, length and breadth has been built, it is covered by sheets of material, hereinbefore referred to, sealed together at their edges, by which the ice is protected not only from the sun but from the atmosphere. In order that the ice may be protected still further and insulated from the heat of the atmosphere and from the heat of the casing, the casing is separated from the ice by any suitable dunnage, and preferably ventilators are arranged at the top of the casing or covering for the emission of a warmer air which seeks the top.

Figure 2:
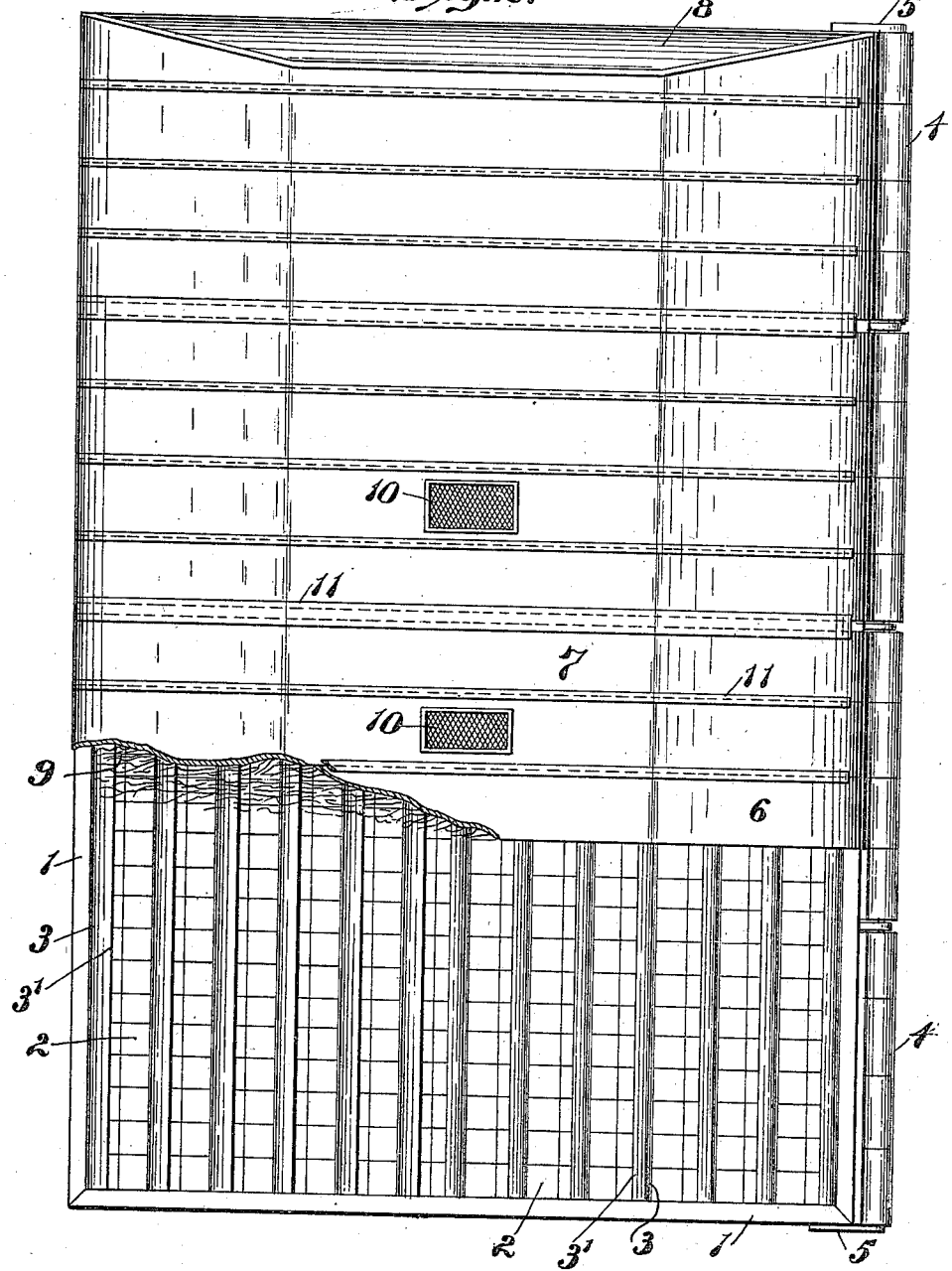

Referring to the accompanying drawings,—Figure 1 represents an end elevation partly in section of an ice stack which is covered and protected in accordance with my invention. Fig. 2 represents a plan view of the same with the covering removed from the end. Fig. 3 represents a front elevation with the covering partially removed. Fig. 4 represents a block of ice incased in a covering of preserving material. Fig. 5 represents a strip of heat insulating material. Fig. 6 represents another form of the material.

Referring to the said drawings, it will be seen that Fig. 1 illustrates an ice stack which consists of blocks of ice 2 arranged in piles or vertical layers which extend longitudinally of the stack and which may be removed *seriatim*. The stack itself may have vertical end and side walls or it may be in the shape of a pyramid as illustrated. Preferably between the vertical layers or piles of ice, I place walls which may be made of my insulating and preserving material which I shall subsequently explain in detail. As illustrated, these walls extend from end to end of the stack so that the ice outside the outer partition may be removed without disturbing the remainder, causing its exposure to the atmosphere. Around the edges of the ice stack at its base are heavy sills 4 of wood, which may be anchored to the earth in any suitable manner, and from the sill at the back of the stack to the sill at the front may be drawn sheets of heat insulating material, which, when sealed together at their edges, provide an air-tight and water-tight covering or protecting casing. In Fig. 1 of the drawings, the covering at the top of the stack is indicated at 7 and the covering at the front side at 6. Preferably the division walls 3 are sealed at their upper edges to the exterior covering, to which end the division walls are extended as illustrated at $3^1$. At $3^2$ I have illustrated how the lower ends of the division walls may be bent under the adjacent layers of ice. The end walls of the covering, which are indicated at 8, are formed of similar sheets of insulating material which are sealed or cemented at their ends and edges to exclude the atmosphere. Preferably between the ice and the protecting covering, to prevent the ice from coming in contact with the covering, and to form air chambers or spaces to protect the ice, I place clean dunnage of any suitable material. Thus I provide for the circulation of air around the ice, at the sides and top, and insulate the ice from the heat of the covering and of the external air. Any suitable dunnage, such as straw, brush or the like, or strips of wood set edgewise to raise the covering from the ice may be used for this purpose. These strips of wood may be connected to form boxings which may be removed bodily when the casing or covering is removed. For ventilating the stack, I may provide ventilators as illustrated at 10 in Fig. 2. These ventilators may be of any suitable nature so that they may be opened and closed as judgment dictates.

For convenience in handling and spreading the sheets or strips which constitute the covering or casing, they are obtained in rolls and may be mounted upon the beam or beams, which may be journaled in supporting brackets 5. The brackets may be supported or attached to the sill at the front side of the stack so that when the strips of insulating material have been secured to the rear sill, they may be drawn over the stack, as illustrated in Fig. 3. The strips of insulating material may conveniently be made of any suitable length and substantially 5 feet in width, (though any other reasonable width will suffice) so that they may be shipped on cars with facility and handled with comparative ease. When the sheets are drawn across the stack, they are overlapped about 2 inches, and the overlapping edges are cemented or sealed together by any suitable cementing material such as melted asphaltum, petroleum residuum or the like. After the stack has been completed, and the casing is in place and sealed against the entrance of the external atmosphere, the lower edges of the casing are secured to the sills 1 by any suitable means such as galvanized nails and washers.

As previously indicated, the material, which I propose to employ for the covering, consists of one or more layers of a suitable fabric such as wool-felt or equivalent material which is impregnated with water-proof material such as asphaltum, sulfur and mineral oils, or petroleum residuum or other substances to render it slow burning, water-proof and air-proof. A single layer may be used as indicated in Fig. 6, in which event, I utilize a layer of wire netting placed against one face of the fabric and more or less embedded therein and joined therewith so that the sheet may be rolled or unrolled without the layers becoming separated. Preferably, however, I employ two layers of the treated fabric with a layer of foraminous material between them, this foraminous material preferably being wire netting, as illustrated in Fig. 5. In this figure the two layers of fabric are indicated at 12 and 14 and the intermediate layer of wire is indicated at 13. In Fig. 6, the wire netting is shown at 15 and the layer of fabric at 16.

I have stated that the vertical layers of ice may be separated by division walls of the same material as the covering but it will be understood that they and the end walls 8 may be replaced by walls formed of plank set edgewise like studding which may be single, or double to provide an air space between them, for the further preservation of the ice. Furthermore it is sometimes convenient to incase each block of ice in a water-proof covering of my insulating material as illustrated in Fig. 4 so that small shipments of ice may be made without loss due to meltage.

From the foregoing description, it will be apparent to any one at all familiar with the art of handling and stacking ice that I have provided a method and means for preserving the ice possessing advantages of the greatest importance. The cover or casing and the dunnage frames are portable and may be used for many years without deterioration. After the ice has been used, the strips may be rolled and stored until the next season and I therefore dispense with the necessity of investing a large amount of capital in costly and permanent ice-house structures. The sheets of material, which insulate the ice from the heat from the external atmosphere, are water-proof, air-proof, and substantially fire-proof inasmuch as they are of such slow burning construction that there is practically no danger of fire. They effectively prevent conduction of heat to the ice so that the latter is prevented from melting or deteriorating. There are many other advantages to which I might advert, but to which it will be unnecessary to refer as they will be apparent to the layman as well as to the expert.

Having thus explained the nature of the invention and described a way of constructing and using the same, although without attempting to set forth all of the forms in which it may be made, or all of the modes of its use, I declare that what I claim is:—

1. As a means for preserving ice, a temporary structure comprising a covering of air-proof water-proof flexible material of slow burning construction adapted to be supported by the ice stack, and division walls adapted to be placed between vertical layers of the ice secured to the covering, all so arranged and combined whereby each layer of ice may be removed without exposing the remainder to the atmosphere.

2. As a means for preserving ice, the combination with dunnage for covering the ice and adapted to rest thereagainst or be supported thereby, a casing or covering of airtight water-proof flexible material of slow burning construction adapted to rest upon the dunnage and be separated thereby from the ice for the formation of insulating air spaces, and sills by which the edges of the covering are secured, substantially as set forth.

In testimony whereof I have affixed my signature, in presence of two witnesses.

EBEN MOODY BOYNTON.

Witnesses:
 HENRY J. THAYER,
 ARTHUR E. THAYER.